US012730328B2

(12) United States Patent
Zhang

(10) Patent No.: US 12,730,328 B2
(45) Date of Patent: Sep. 8, 2026

(54) DETECTION LENS AND DETECTION METHOD FOR A HEAD-MOUNTED DISPLAY

(71) Applicant: Goertek Optical Technology Co., Ltd., Weifang (CN)

(72) Inventor: Shiyu Zhang, Shandong (CN)

(73) Assignee: Goertek Optical Technology Co., Ltd., Weifang (CN)

( * ) Notice: Subject to any disclaimer, the term of this patent is extended or adjusted under 35 U.S.C. 154(b) by 231 days.

(21) Appl. No.: 18/725,916

(22) PCT Filed: Dec. 31, 2021

(86) PCT No.: PCT/CN2021/143909

§ 371 (c)(1),
(2) Date: Jul. 1, 2024

(87) PCT Pub. No.: WO2023/123446

PCT Pub. Date: Jul. 6, 2023

(65) Prior Publication Data

US 2025/0093668 A1 Mar. 20, 2025

(51) Int. Cl.
*G02B 27/01* (2006.01)
*G02B 27/09* (2006.01)

(52) U.S. Cl.
CPC ..... *G02B 27/0179* (2013.01); *G02B 27/0172* (2013.01); *G02B 27/0955* (2013.01)

(58) Field of Classification Search
CPC ............ G02B 27/0172; G02B 27/0179; G02B 2027/0198; G02B 27/0955; G02B 13/0045; G02B 13/006; G02B 9/64
See application file for complete search history.

(56) References Cited

U.S. PATENT DOCUMENTS

2022/0397744 A1* 12/2022 Pang ...................... G02B 13/06

* cited by examiner

*Primary Examiner* — Paisley L Wilson
(74) *Attorney, Agent, or Firm* — Baker Botts, L.L.P.

(57) ABSTRACT

The present disclosure discloses a detection lens for a head-mounted display provided with a light incident end, and configured for receiving light from the light incident end; the detection lens comprises a lens group, and an overall entrance pupil of the lens group overlaps with its own aperture stop; the lens group comprises a first lens group and a second lens group, the first lens group is close to the light incident end relative to the second lens group along an axial direction of the detection lens; the second lens group comprises a double-Gauss lens group, the double-Gauss lens group is located close to the light incident end in the second lens group, and a side of the double-Gauss lens group close to the light incident end is provided with at least three Gauss lenses which have positive focal powers.

10 Claims, 5 Drawing Sheets

LONGITUDINAL
SPHERICAL ABER.

DETECTION LENS AND DETECTION METHOD FOR A HEAD-MOUNTED DISPLAY

CROSS-REFERENCE TO RELATED APPLICATIONS

The present disclosure is a National Stage of International Application No. PCT/CN2021/143909, filed on Dec. 31, 2021, which is hereby incorporated by reference in its entirety.

TECHNICAL FIELD

The present disclosure relates to the field of optics, and in particular, to a detection lens and a detection method for a head-mounted display.

BACKGROUND

In recent years, consumer electronics products are becoming popular in the market. Among them, virtual reality devices (VR) and augmented reality devices (AR), because of their special display effects, are capable of immersing users into special audio-visual effects, and therefore are widely favored by consumers. In practical applications, since VR and AR devices perform displaying at positions very close to the human eye, their imaging effect differ from those of traditional TVs and displays. Accordingly, detection of the display effects of VR and AR devices require special detection lenses.

Existing display detection lenses are often unable to meet demands of the detection function of such close-range displays, as such form of detection needs to simulate the close-range visualization of the human eye.

Therefore, it is necessary to improve the detection lenses used for detection.

SUMMARY

An objective of embodiments of the present disclosure is to provide a new technical solution for detecting the display effect of a head-mounted display.

To achieve the objective of the present disclosure, the present disclosure provides the following technical solutions:

According to an aspect of the present disclosure, a detection lens for a head-mounted display is provided, the detection lens is provided with a light incident end, and is configured for receiving light from the light incident end;

the detection lens comprises a lens group, and an overall entrance pupil of the lens group overlaps with its own aperture stop;

the lens group comprises a first lens group and a second lens group, the first lens group is close to the light incident end relative to the second lens group along an axial direction of the detection lens, an effective focal length of the first lens group ranges from 20 mm to 40 mm, a magnification of the second lens group ranges from 0.5 to 2, and an effective focal length of the second lens group ranges from 195 mm to 285 mm;

the second lens group comprises a double-Gauss lens group, the double-Gauss lens group is located close to the light incident end in the second lens group, and a side of the double-Gauss lens group close to the light incident end is provided with at least three Gauss lenses which have positive focal powers;

the detection lens has a lateral angle of view of less than or equal to 120 degrees and a longitudinal angle of view of less than or equal to 80 degrees.

Optionally, the effective focal length of the first lens group ranges from 22 mm to 25 mm.

Optionally, the magnification of the second lens group ranges from 0.6 to 1.0.

Optionally, the first lens group comprises three condenser lenses, which are a first condenser lens, a second condenser lens, and a third condenser lens respectively. The first condenser lens is close to the light incident end relative to the second condenser lens, and the second condenser lens is close to the light incident end relative to the third condenser lens;

the radius of curvature of the light incident surface of the first condenser lens ranges from −20.5 mm to −21.9 mm, the radius of curvature of the light emergent surface of the first condenser lens ranges from −17.7 mm to −18.5 mm, and the thickness of the first condenser lens ranges from 10.4 mm to 11.3 mm;

the distance between the first condenser lens and the second condenser lens is 0.3 mm;

the radius of curvature of the light incident surface of the second condenser lens ranges from −50.3 mm to −51.8 mm, the light emergent surface radius of curvature of the second condenser lens ranges from −34.1 mm to −34.9 mm, and the thickness of the second condenser lens ranges from 8.5 mm to 8.8 mm;

the distance between the second condenser lens and the third condenser lens ranges from 0.3 mm to 0.7 mm;

the radius of curvature of the light incident surface of the third condenser lens ranges from −160 mm to −300 mm, the radius of curvature of the light emergent surface of the third condenser lens ranges from −60 mm to −80 mm, and the thickness of the third condenser lens ranges from 8.0 mm to 8.7 mm.

Optionally, the radius of curvature of the light incident surface of the first condenser lens is −21.69 mm, the radius of curvature of the light emergent surface of the first condenser lens is −18.24 mm, and the thickness of the first condenser lens is 11.13 mm;

the radius of curvature of the light incident surface of the second condenser lens is −50.44 mm, the radius of curvature of the light emergent surface of the second condenser lens is −34.70 mm, and the thickness of the second condenser lens is 8.72 mm;

the distance between the second condenser lens and the third condenser lens is 0.62 mm;

the radius of curvature of the light incident surface of the third condenser lens is −171.77 mm, the radius of curvature of the light emergent surface of the third condenser lens is −67.35 mm, and the thickness of the third condenser lens is 8.25 mm.

Optionally, the radius of curvature of the light incident surface of the first condenser lens is −20.74 mm, the radius of curvature of the light emergent surface of the first condenser lens is −17.87 mm, and the thickness of the first condenser lens is 10.53 mm;

the radius of curvature of the light incident surface of the second condenser lens is −51.62 mm, the radius of curvature of the light emergent surface of the second condenser lens is −34.26 mm, and the thickness of the second condenser lens is 8.65 mm;

the distance between the second condenser lens and the third condenser lens is 0.30 mm;

the radius of curvature of the light incident surface of the third condenser lens is −287.14 mm, the radius of curvature of the light emergent surface of the third condenser lens is −74.95 mm, and the thickness of the third condenser lens is 8.51 mm.

Optionally, the condenser lens is a crescent-shaped lens.

Optionally, the second lens group comprises a collimating lens group, and the double-Gauss lens group is close to the light incident end relative to the collimating lens group.

Optionally, the first lens group and the second lens group have a diameter of less than or equal to 65 mm.

Optionally, the double-Gauss lens group comprises three Gauss lenses, which are a first Gauss lens, a second Gauss lens, and a third Gauss lens respectively;

a radius of curvature of a light incident surface of the first Gauss lens ranges from 59.5 mm to 62.5 mm, a radius of curvature of a light emergent surface of the first Gauss lens ranges from −165.5 mm to −156.7 mm, and a thickness of the first Gauss lens ranges from 14.0 mm to 15.0 mm;

a distance between the first Gauss lens and the second Gauss lens is 0.3 mm;

a radius of curvature of a light incident surface of the second Gauss lens ranges from 36.0 mm to 39.0 mm, a radius of curvature of a light emergent surface of the second Gauss lens ranges from 60.0 mm to 66.0 mm, and a radius of curvature of a light emergent surface of the second Gauss lens ranges from 60.0 mm to 66.0 mm;

a distance between the second Gauss lens and the third Gauss lens ranges from 3.0 mm to 3.2 mm;

a radius of curvature of a light incident surface of the third Gauss lens ranges from 153.0 mm to 156.9 mm, a radius of curvature of a light emergent surface of the third Gauss lens ranges from 23.5 mm to 25.3 mm, and a thickness of the first Gauss lens ranges from 7.8 mm to 8.3 mm;

Optionally, the first lens group is configured to be able to move as a whole along an axial direction of the detection lens.

The present disclosure further provides a detection method for a head-mounted display, comprising:

using the above detection lens;

aligning a light incident end of the detection lens with the head-mounted display to be detected;

adjusting, along an axial direction of the lens, the light incident end of the detection lens to a position overlapping with an exit pupil projected by the head-mounted display to be detected; and acquiring, with the detection lens, an image projected by the head-mounted display to be detected.

One technical effect of the embodiments of the present disclosure is that the detection lens simulates the close-range visualization of the human eye, and may detect the head-mounted display performing close-range displaying. By configuration of the lens group, the detection lens controls the lateral angle of view at 70 degrees and the longitudinal angle of view at 80 degrees, and therefore is capable of detecting the head-mounted display with the wide-screen display effect.

BRIEF DESCRIPTION OF THE DRAWINGS

In order to clearly illustrate embodiments of the present disclosure or technical solutions in the prior art, accompanying drawings that need to be used in description of the embodiments or the prior art will be briefly introduced as follows. Obviously, drawings in following description are only the embodiments of the present disclosure. For those skilled in the art, other drawings can also be obtained according to the disclosed drawings without creative efforts.

DETAILED DESCRIPTION

The technical solutions in the embodiments of the present disclosure will be clearly and completely described below with reference to the drawings in the embodiments of the present disclosure. Apparently, the described embodiments are merely some rather than all of the embodiments of the present disclosure. All other embodiments, acquired by those of ordinary skill in the art based on the embodiments of the present disclosure without any creative work, should fall into the protection scope of the present disclosure.

The present disclosure provides a detection lens for a head-mounted display. The detection lens comprises a lens group, which comprises a first lens group and a second lens group.

The detection lens is provided with a light incident end. In an actual application, the light incident end of the detection lens faces toward the display device to be detected, and light enters into the detection lens from the light incident end. An overall entrance pupil of the lens group overlaps with its own aperture stop. In actual application, the position of the image projected by the display to be detected corresponds to the position of the light incident end of the detection lens, and the light of the image emitted by the display to be detected enters into the detection lens from the light incident end. The detection lens provided by the technical solution may simulate the close-range visual characteristics of the human eye, and the light emergent aperture of the display to be detected overlaps with the light incident end of the detection lens along the optical axis direction. This design conforms to the viewing characteristics of the human eye.

Figure 1:
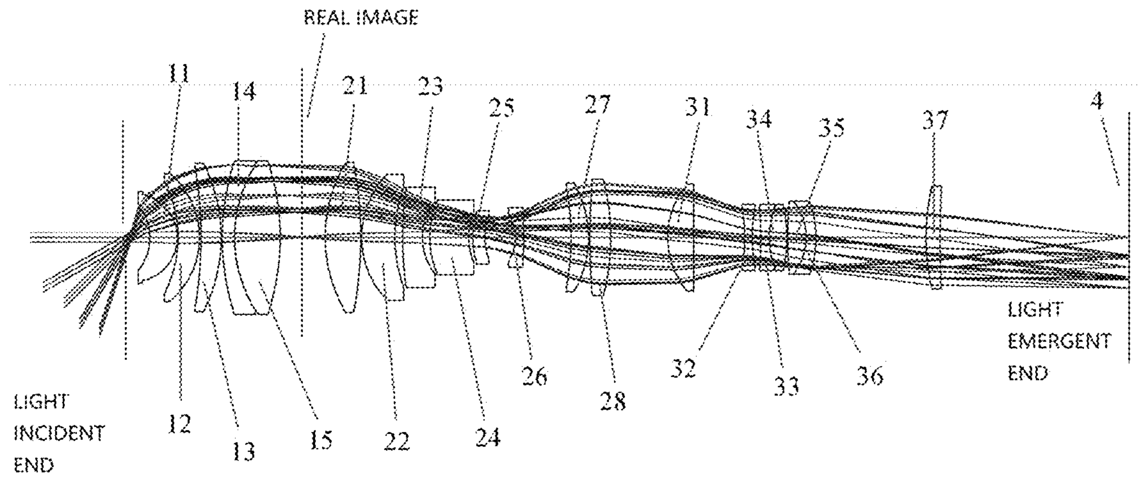
FIG. 1 is a schematic diagram of a lens group provided according to an embodiment of the present disclosure.
Figure 2A:
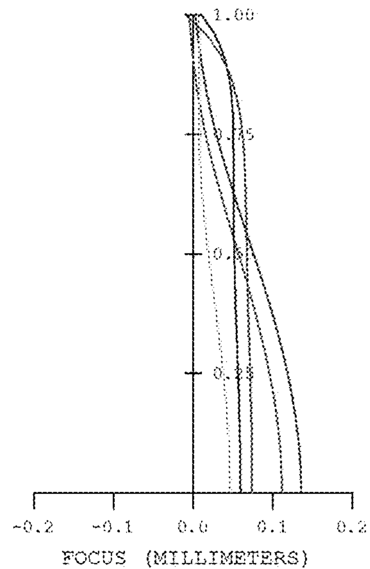
FIG. 2(*a*) to FIG. 2(*c*) are schematic diagrams of imaging parameters of a detection lens according to the embodiment shown in FIG. 1.
Figure 2B:
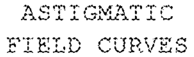
Figure 2B:
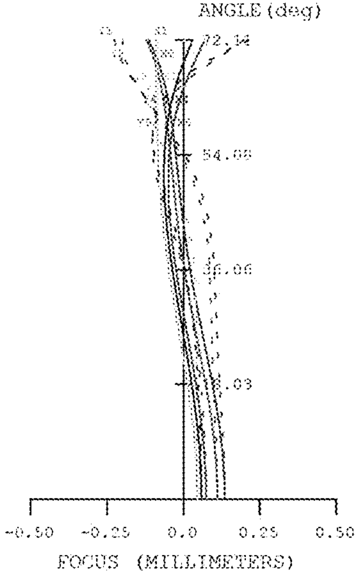
Figure 2C:
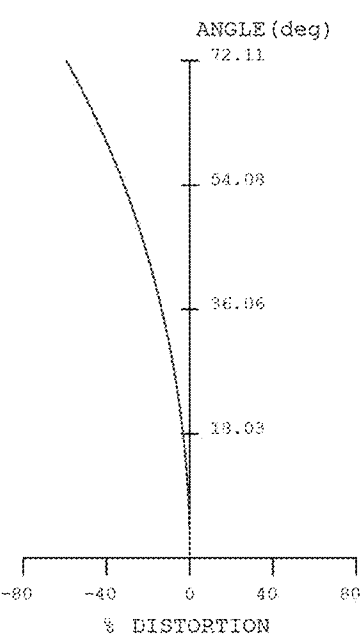

The detection lens is provided with the lens group therein. The overall entrance pupil of the lens group overlaps with its own aperture stop. This optical system form conforms to the optical form of the human eye and may better simulate the observation of the human eye. The lens group comprises a first lens group and a second lens group. As shown in FIG. 1, the light incident end of the detection lens is used to receive light, the light is emitted from one side of the light emergent end, and an optical sensor may be set at the light emergent end for receiving the image. Along the direction from the light incident end to the light emergent end, the first lens group and the second lens group are arranged in sequence. That is, the first lens group is located on a side of the second lens group close to the light incident end.

The first lens group is mainly used to collect and gather the light emitted by the head-mounted display. Optionally, the first lens group comprises at least two condenser lenses, and the condenser lens has a positive focal power and may converge the light incident from the incident end into a certain range. As shown in FIG. 1, the positive focal power of the condenser lens is positive, and the scattered light on one side of the incident end may converge into the detection lens after being processed by the condenser lens and propagated toward the light emergent end. The light converged into the detection lens may be optically processed by subsequent lenses, thereby realizing imaging on the optical sensor.

The second lens group is used to perform optical processing on the light incident on the detection lens to correct the aberration of the image projected by the display device. As shown in FIGS. 1 and 2, the second lens group processes aberrations such as spherical aberration and astigmatism with a plurality of lenses.

Optionally, the second lens group may comprise a double-Gauss lens group and a collimating lens group, and the double-Gauss lens group and the collimating lens group comprehensively regulate the above aberration. The double-Gauss lens may be mainly used to regulate the aberrations caused by the asymmetry of the optical system, and the collimating lens is used to correct the light to tend to be parallel light.

In the present solution, as shown in FIG. 1, along the direction from the light incident end to the light emergent end, the double-Gauss lens group is located closer to the light incident end. That is, the double-Gauss lens group is closer to the light incident end relative to the collimated lens group. The double-Gauss lens group comprises at least three Gauss lenses with positive optical power, which are located closer to the light incident end in the double-Gauss lens group. The above three Gauss lenses may be the first Gauss lens, the second Gauss lens, and the third Gauss lens. The three Gauss lenses are used to converge the lights projected by the first lens group toward the center of the optical axis.

Optionally, the overall effective focal length of the first lens group may be selected to range from 20 mm to 40 mm, and the overall effective focal length of the second lens group may be selected to range from 50 mm to 500 mm. Preferably, the range may be within 195 mm-285 mm. The overall effective focal length of the first lens group and the second lens group is coordinated so that the lateral angle of view of the detection lens is less than or equal to 120 degrees and the longitudinal angle of view of the detection lens is less than or equal to 80 degrees. The design method enables the detection field of view of the detection lens to be relatively wide, is suitable for shooting the head-mounted display device with a wide-screen display effect, and may perform effect detection on the display image of the head-mounted display at a close distance. The magnification range of the second lens group may be optionally controlled between 0.5-2 times. Through this magnification range, the second lens group may scale the image to a certain extent on the image while reducing the image aberration, thereby achieving an appropriate detection effect.

The present solution effectively simulates the optical state when the human eye actually observes the detection lens of the head-mounted display by firstly designing the entrance pupil of the lens group to coincide with the aperture stop. When actually testing, the position of the image projected by the head-mounted display may be adjusted to a position that overlaps with the light incident end. In order to enable the human eye to view the image when it is being displayed, the head-mounted display projects the image at a predetermined location through an internal lens. By overlapping this position with the light incident, it is possible to well simulate the observation state of the human eye. When using the detection lens provided by the present solution for testing, it is possible to bring the light incident end of the detection lens close to the head-mounted display and in a position where the image is projected. In this way, the state of the detection lens when capturing images may be consistent with the state of the human eye observing the image.

Further, in the present solution, the entrance pupil of the detection lens overlaps with its own aperture stop, which will result in a lens being provided only on one side of the aperture stop along the direction from the light incident end to the light emergent end. This positional relationship causes the optical system to be asymmetric on both sides of the aperture stop, and this imaging method is more likely to produce the aberration. In this regard, the present solution provide the first lens group in the detection lens, and the first lens group may also play a role in providing an intermediate image for the second lens group. That is, as shown in FIG. 1, after optical processing by the first lens group, the first lens group may image the image of the AR or VR device between the first lens group and the second lens group. The second lens group receives the real image between the first lens group and the second lens group, and further performs aberration processing. By performing a real image imaging between the first lens group and the second lens group, it helps to solve the problem of asymmetry of the optical system. The real image imaging between the first lens group and the second lens group is equivalent to the entrance pupil of the second lens group. Moreover, the detection lens has a wide angle of view range, and may complete the detection of the display effect of VR and AR head-mounted displays with wide-screen display effect at one time, without adjusting the relative position of the display device and the detection lens.

By using the detection lens provided by the present solution, it is possible to more accurately simulate the viewing state of the human eye, and to detect the display at the close distance of the head-mounted display effectively and accurately.

The head-mounted display mentioned in the present solution may be the virtual reality device (VR), augmented reality device (AR) and other devices that need to be worn on the head and viewed from a close distance by a user. Such devices all have the problem of being unable to effectively simulate the observation form of the human eye during detection. The detection lens provided by the present solution may solve the simulation problem.

Optionally, the effective focal length of the first lens group may range from 22 mm to 25 mm. This makes it easier for the detection lens to generate a larger angle of view, making the angle of view closer to 120 degrees. If the effective focal length of the first lens group is too small, the light in the too large angle range will be collected, making it steeply more difficult for subsequent lenses to deal with field aberrations, and the number of lenses of the first lens group and the second lens group and the length along the direction of the detection lens will be affected. If the effective focal length of the first lens group is too large, it is necessary to adjust the diameter of the first lens group and the detection lens, such that the angle of view reaches a suitable range. Moreover, an excessively long focal length makes it difficult for the detection lens to achieve an angle of view close to 120 degrees. In the implementation where the effective focal length of the first lens group meets the above range, in conjunction with the second lens group with an effective focal length ranging from 195 mm to 285 mm, it is possible to accurately capture and image the images within the range of less than or equal to 120*80 degrees of angle of view. When the effective focal length ranges of the second lens group and the first lens group are matched within the above range, the imaging accuracy is higher, and it is possible to more effectively detect the imaging effect of the head-mounted display.

Optionally, the magnification of the second lens group may range from 0.6 to 1.0. Within this range, the second lens group may more reliably perform aberration correction on the real image with a large angle of view generated by the first lens group. If the magnification of the second lens group is too large, the size of the aberration that needs to be corrected will also increase, which will increase the difficulty of aberration correction. In order to correct a larger aberration, the diameter of the second lens group may need to be increased, and the number of lenses comprised may also need to be increased. If the magnification of the second lens group is too small, the aberration that needs to be adjusted and corrected is too subtle, which will increase the precision requirements on the lenses in the second lens group. If the molding accuracy of the lenses in the second lens group is not enough, it may not be possible to adjust the subtle aberration. Therefore, the present solution preferably adopts a second lens group with a magnification ranging from 0.7 to 1.3, so as to better achieve aberration correction.

Optionally, in a specific implementation, the effective focal length of the first lens group is 23.4 mm, the effective focal length of the second lens group is 235 mm, and the magnification of the second lens group is 0.72. In the present implementation, the detection lens may accurately detect the light image projected by the head-mounted display in a range with a lateral angle of view of 120 degrees and a longitudinal angle of view of 80 degrees, and correct the aberration caused by its own image acquisition.

FIG. 2 shows an aberration diagram of the field formed by light of different wavelengths according to this embodiment. FIG. 2(*a*) is a diagram of the longitudinal spherical aberration, which reflects the effect of the detection lens as a whole on the longitudinal spherical aberration formed by the light. The first lens group and the second lens group according to the present embodiment limit the spherical aberration within a limited range. FIG. 2(*b*) shows a field curve of astigmatism, which reflects the effect of the detection lens as a whole on the astigmatism formed by the light. The first lens group and the second lens group of the present implementation limit the astigmatism to a smaller extent. FIG. 2(*c*) is a distortion diagram, which is used to show the distortion effect of the detection lens as a whole on the image. In the present implementation, the first lens group and the second lens group project the image light in a form forming a barrel distortion so that the image light in the entire angle of view range can be projected on the image sensor 4.

The different lines in FIGS. 2(*a*) to 2(*c*) represent light with different wavelengths.

Optionally, the detection lens comprises an image sensor 4, which is provided at the light emergent end of the detection lens and is used to receive the light and image processed by the detection lens. The image sensor 4 images the image projected by the head-mounted display so as to analyze the display effect.

In the above implementation, the image sensor 4 may optionally have a pixel less than or equal to 4.5 microns, and its color registration may be controlled to be less than or equal to 7.9 microns. The image sensor 4 with a pixel size of less than or equal to 4.5 microns is generally capable of clearly capturing the image of the macro display, and facilitates analysis and detection of the display effect. In the practical application, an image sensor 4 with a smaller pixel size may also be used.

Optionally, the condenser lens is preferably a crescent-shaped lens. When the condenser lens has the positive focal power, it is further formed into the crescent-shaped lens. This design can further improve the light-gathering effect of the condenser lens, so that the light within the predetermined angle of view converges into the detection lens by the condenser lens as much as possible. The edge of the crescent-shaped lens is bent and extended relative to the center, making it easier to collect and converge light at a large angle. In addition, since the crescent-shaped lens with the positive focal power is relatively thin at the edge and the curvature radius of the light incident surface and the light emergent surface are relatively close, the chromatic aberration of the lens is relatively small, and the aberration generated after the light passes through the lens is relatively small. This design reduces the difficulty of aberration correction for the subsequent lens group.

Optionally, the first lens group and the second lens group can form a flat-field lens group "f-tan(theta) lens" or a fisheye lens group "f-theta lens". The final imaging effect of the flat-field lens group has low distortion and the image is flat. This lens group can evenly utilize the pixels of the image sensor 4 to display the projection effect of the head-mounted display for subsequent analysis.

The final imaging effect of the fisheye lens group has high distortion, and the image is barrel distorted. The central area of the image is imaged normally, while the surrounding area presents a curved, annularly deformed image. This form of distortion of the fisheye lens group helps to increase the overall angle of view of the detection lens, which can be used to detect images within a larger angle of view. The image projected by the head-mounted display to be detected may occupy a larger angle of view relative to the human eye at the observation position. In order to be able to detect display images within a larger angle of view, the detection lens also needs to have detection performance with a large angle of view.

Optionally, for an implementation using the fisheye lens group "f-theta lens", the present solution provides two implementation plans.

In the first implementation plan, the first lens group may comprise three condenser lenses, which are a first condenser lens 11, a second condenser lens 12 and a third condenser lens 13. As shown in FIG. 1, the first condenser lens 11, the second condenser lens 12 and the third condenser lens 13 are arranged in sequence along a direction from the light incident end to the light emergent end. The first condenser lens 11 is located on a side of the second condenser lens close to the light incident end.

The present technical solution is described below using the fisheye lens group shown in FIG. 1.

The first condenser lens 11, the second condenser lens 12 and the third condenser lens 13 converge lights in a range with an angle of view less than or equal to 120*80 degrees into the detection lens, achieving the collection of these lights.

Optionally, the radius of curvature of the light incident surface of the first condenser lens 11 ranges from −20.5 mm to −21.9 mm, the radius of curvature of the light emergent surface of the first condenser lens 11 ranges from −17.7 mm to −18.5 mm, and the thickness of the first condenser lens 11 ranges from 10.4 mm to 11.3 mm.

For example, in an implementation, the radius of curvature of the light incident surface of the first condenser lens 11 is −21.9 mm, the radius of curvature of the light emergent surface of the first condenser lens 11 is −18.24 mm, and the thickness of the first condenser lens 11 is 11.13 mm.

Optionally, the radius of curvature of the light incident surface of the second condenser lens 12 ranges from −50.3 mm to −51.8 mm, the radius of curvature of the light emergent surface of the second condenser lens 12 ranges from −34.1 mm to −34.9 mm, and the thickness of the second condenser lens 12 ranges from 8.5 mm to 8.8 mm.

For example, in an implementation, the radius of curvature of the light incident surface of the second condenser lens 12 is −50.44 mm, the radius of curvature of the light emergent surface of the second condenser lens 12 is −34.70 mm, and the thickness of the second condenser lens 12 is 8.72 mm.

Optionally, the radius of curvature of the light incident surface of the third condenser lens 13 ranges from −160 mm to −300 mm, the radius of curvature of the light emergent surface of the third condenser lens 13 ranges from −60 mm to −80 mm, and the thickness of the third condenser lens 13 ranges from 8.0 mm to 8.7 mm.

For example, in an implementation, the radius of curvature of the light incident surface of the third condenser lens 13 is −171.77 mm, the radius of curvature of the light emergent surface of the third condenser lens 13 is −67.35 mm, and the thickness of the third condenser lens 13 is 8.25 mm.

Optionally, the distance between the first condenser lens 11 and the second condenser lens 12 is 0.3 mm. Optionally, the distance between the second condenser lens 12 and the third condenser lens 13 is 0.62 mm.

In the above implementation, the three condenser lenses can accurately gather lights in the range with an angle of view of about 120 degrees*80 degrees into the detection lens, and parallelize the irradiation directions of the lights, so that the lights are illuminated onto the subsequent lenses with minimal aberration. If the radii of curvatures of the light incident surfaces and the light emergent surfaces of the first condenser lens 11, the second condenser lens 12 and the third condenser lens 13 differ significantly from the above ranges, the aberration generated after the image light passes through the condenser lens is likely to increase, thereby increasing the difficulty of eliminating the subsequent aberration. The focal length of the first condenser lens 11 is less than that of the second condenser lens 12, and the focal length of the second condenser lens 12 is less than that of the third condenser lens 13. The light gradually propagates toward the axis direction of the detection lens after entering from the light incident end, and tends to be parallel. This gentle refractive effect helps to reduce the occurrence of aberrations between different wavelengths of light.

In addition to the first condenser lens 11, the second condenser lens 12 and the third condenser lens 13, the first lens group may also comprise a plurality of lenses to form an intermediate real image after the light passes through the first lens group.

In one optional implementation, the first lens group comprises the above first condenser lens 11, second condenser lens 12 and third condenser lens 13, as well as two first collimating lenses. The two first collimating lenses are arranged in the direction from the light incident end to the light emergent end as lenses 14, and 15 in the following table.

Table 1 presents the parameters of each lens in the first lens group in this implementation:

TABLE 1

| | radius of curvature of light incident surface mm | radius of curvature of light emergent surface mm | thickness of lens mm | distance from the lens on the side of the light emergent end mm |
|---|---|---|---|---|
| first condenser lens 11 | −21.697 | −18.240 | 11.139 | 0.301 |
| second condenser lens 12 | −50.443 | −34.709 | 8.721 | 0.627 |
| third condenser lens 13 | −171.78 | −67.357 | 8.252 | 0.410 |
| lens 14 | 102.564 | 56.526 | 5.000 | 0 |
| lens 15 | 56.526 | −99.819 | 18.648 | 9.585 |

Table 1 shows an implementation of a lens group "f-theta lens" in this solution, as shown in FIG. 1. Wherein, on the side of the light emergent end of the lens 15, it is the real image presented by the first lens group in the detection lens, and the distance between the lens 15 and the real image along the optical axis is 9.584532 mm. On the side of the light incident end of the first condenser lens 11, it is the real image (exit pupil) projected by the head-mounted display, and the distance between the real image and the first condenser lens 11 along the optical axis is 8.041887 mm. In particular, in this solution, the light incident end and the real image projected by the head-mounted display are at the same position, that is, the distance between the light incident end and the first condenser lens 11 may also be 8.041887 mm. As shown in FIG. 1, the angle of view of this optional specific implementation is close to 120 degrees*80 degrees.

As described above, the second lens group is used to compensate for aberrations generated during the overall imaging process, ultimately forming an image on the image sensor 4 located at the light emergent end. Optionally, the second lens group may comprise a double-Gauss lens group and a collimating lens group.

Optionally, the double-Gauss lens group comprises at least three Gauss lenses, which are a first Gauss lens 21, a second Gauss lens 22, and a third Gauss lens 23 respectively, and are arranged in sequence along the direction from the light incident end to the light emergent end.

Optionally, a radius of curvature of a light incident surface of the first Gauss lens 21 ranges from 59.5 mm to 62.5 mm, a radius of curvature of a light emergent surface of the first Gauss lens 21 ranges from −165.5 mm to −156.7 mm, and a thickness of the first Gauss lens 21 ranges from 14.0 mm to 15.0 mm.

For example, in an implementation, the radius of curvature of the light incident surface of the first Gauss lens 21 is 60.8 mm, the radius of curvature of the light emergent surface of the first Gauss lens 21 is −164.1 mm, and the thickness of the first Gauss lens 21 is 14.5 mm.

Optionally, a radius of curvature of a light incident surface of the second Gauss lens 22 ranges from 36.0 mm to 39.0 mm, a radius of curvature of a light emergent surface of the second Gauss lens 22 ranges from 60.0 mm to 66.0 mm, and a thickness of the second Gauss lens 22 ranges from 13.0 mm to 14.0 mm.

For example, in an implementation, the radius of curvature of the light incident surface of the second Gauss lens 22 is 37.5 mm, the radius of curvature of the light emergent surface of the second Gauss lens 22 is 61.5 mm, and the thickness of the second Gauss lens 22 is 13.6 mm.

Optionally, a radius of curvature of a light incident surface of the third Gauss lens 23 ranges from 153.0 mm to 156.9 mm, a radius of curvature of a light emergent surface of the third Gauss lens 23 ranges from 23.5 mm to 25.3 mm, and a thickness of the third Gauss lens 23 ranges from 7.8 mm to 8.3 mm.

For example, in an implementation, the radius of curvature of the light incident surface of the third Gauss lens 23 is 154.5 mm, the radius of curvature of the light emergent surface of the third Gauss lens 23 is 24.3 mm, and the thickness of the third Gauss lens 23 is 7.9 mm.

Optionally, a distance between the first Gauss lens 21 and the second Gauss lens 22 is 0.3 mm. Optionally, a distance between the second Gauss lens 22 and the third Gauss lens 23 ranges from 3.0 mm to 3.2 mm. For example, the distance between the second Gauss lens 22 and the third Gauss lens 23 is 3.1 mm.

In the solution shown in FIG. 1, the double-Gauss lens group may consist of eight lenses, wherein the first five lenses converge the light, and the last three lenses further adjust the lights to form scattered, relatively parallel lights. These eight lenses are arranged in sequence from the light incident end to the light emergent end as Gauss lens 21, Gauss lens 22, Gauss lens 23, Gauss lens 24, Gauss lens 25, Gauss lens 26, Gauss lens 27, and Gauss lens 28.

The parameters of various lenses in the double-Gauss lens group for this implementation are presented in the following Table 2:

TABLE 2

| | radius of curvature of light incident surface mm | radius of curvature of light emergent surface mm | thickness of lens mm | distance from the lens on the side of the light emergent end mm |
|---|---|---|---|---|
| Gauss lens 21 | 60.792 | −164.180 | 14.519 | 0.300 |
| Gauss lens 22 | 37.569 | 61.583 | 13.617 | 3.171 |
| Gauss lens 23 | 154.541 | 24.370 | 8.000 | 3.037 |
| Gauss lens 24 | 39.628 | 26.248 | 15.840 | 1.641 |
| Gauss lens 25 | 36.167 | 25.090 | 4.944 | 12.516 |
| Gauss lens 26 | −18.326 | −257.569 | 3.280 | 19.327 |
| Gauss lens 27 | −112.623 | 44.648 | 7.127 | 0.576 |
| Gauss lens 28 | 294.441 | −95.929 | 8.497 | 23.181 |

Table 2 shows parameters of various lenses of the double-Gauss lens group of the lens group "f-theta lens" in the solution shown in FIG. 1, as shown in FIG. 1. Wherein, on the side of the light emergent end of the lens 15, it is the other lenses of the second lens group in the detection lens, and the distance along the optical axis between gauss lens 28 and the next lens is 23.180907 mm. On the side of the light incident end of the gauss lens 21, it is the real image (exit pupil) formed by the first lens group in the detection lens, and the distance along the optical axis between the real image and gauss lens 21 is 8.695056 mm. In this solution, the double-Gauss lens group converges and then scatters the various colors of light of the image to compensate for the aberration of light of different wavelengths and reduce the interference of aberration on imaging detection.

As shown in FIG. 1, the collimating lens group may comprise seven lenses. In this implementation, the various collimating lenses are collimating lens 31, collimating lens 32, collimating lens 33, collimating lens 34, collimating lens 35, collimating lens 36, and collimating lens 37 in sequence along the direction from the light incident end to the light emergent end. The collimating lens group is used to converge the scattered light processed by the double-Gauss lens group into a regionally parallel beam, and the lights of various colors of different wavelengths converge into a regionally parallel image again, so as to facilitate imaging on the image sensor 4 at the light emergent end.

The parameters of various lenses in the collimating lens group for this implementation are presented in the following Table 3:

TABLE 3

| | radius of curvature of light incident surface mm | radius of curvature of light emergent surface mm | thickness of lens mm | distance from the lens on the side of the light emergent end mm |
|---|---|---|---|---|
| collimating lens 31 | 34.947 | −4625.230 | 10.587 | 20.801 |
| collimating lens 32 | −70.390 | 59.691 | 3.000 | 3.548 |
| collimating lens 33 | −153.217 | 35.708 | 3.500 | 0 |
| collimating lens 34 | 35.708 | −63.811 | 7.081 | 0.300 |
| collimating lens 35 | 138.494 | −24.009 | 7.634 | 0 |
| collimating lens 36 | −24.009 | −44.007 | 4.000 | 44.772 |
| collimating lens 37 | 90.374 | 506.973 | 5.787 | 77.036 |

Table 3 shows parameters of various lenses of the collimating lens group of the fisheye lens group "f-theta lens" in the solution shown in FIG. 1, as shown in FIG. 1. Wherein, on the side of the light emergent end of the collimating lens 37, it is the image sensor 4, and the distance between the collimating lens 37 and the image sensor 4 along the optical axis is 77.035957 mm. In particular, the light incident surface and the light emergent surface of the collimating lens 37 are smooth and have a large radius of curvature, which minimizes the aberration generated again after the light enters into the collimating lens 37, and the collimating lens 37 is used to calibrate the direction of the image light so that the light is irradiated on the image sensor 4 in a parallel form. On the side of light incident end of the collimating lens 31, it is the last Gauss lens of the second lens group, that is, Gauss lens 28.

Optionally, in this solution, different glass materials may be used for different lenses to achieve better optical effects. Different glass materials have different refractive indices and astigmatism effects on light of different wavelengths. The glass material may be selected from existing standard glass materials. Taking the technical solution shown in FIG. 1 as an example, for the first lens group, the glass number of the first condenser lens 11 is 946179, the glass number of the second condenser lens 12 is 805255, the glass number of the third condenser lens 13 is 835427, the glass number of lens 14 is 805255, and the glass number of lens 15 is 438945.

For the double-Gauss lens group, the glass number of the gauss lens 21 is 438945, the glass number of the gauss lens 22 and the gauss lens 23 is 805255, the glass number of the gauss lens 24 is 717295, the glass number of the gauss lens 25 is 946179, the glass number of gauss lens 26 is 518590, the glass number of gauss lens 27 is 805255, and the glass number of gauss lens 28 is 835427.

For the collimating lens group, the glass number of the collimating lens 31 is 438945, the glass number of the collimating lens 32 is 923209, the glass number of the collimating lens 33 is 805255, the glass number of the collimating lens 34 is 438945, the glass number of the collimating lens 35 is 593683, and the glass number of the collimating lens 36 is 805255, and the glass number of the collimating lens 37 is 593683.

FIG. 2 shows the limiting effect of the embodiment shown in FIG. 1 on image aberration. FIG. 2(*a*) is a schematic diagram of longitudinal spherical aberration; FIG. 2(*b*) is a schematic diagram of field astigmatism; FIG. 2(*c*) is a schematic diagram of distortion. The distortion amount in the present implementation is large, and the first lens group and the second lens group form the fisheye lens group.

Optionally, the first lens group may be along the axial direction of the detection lens, and the axial movement may realize the focus detection of the detection lens, so that the image projected by the head-mounted display to be detected is accurately focused and imaged on the image sensor 4.

In a preferred implementation, the second lens group as a whole may move along the axial direction of the detection lens. The second lens group has a relatively longer overall focal length, and may more accurately focus the lens through axial movement, so that the detection lens may accurately capture the image projected by the head-mounted display. This design method may minimize the imaging error of the detection lens itself, and thus accurately reflect the imaging effect of the head-mounted display to be detected.

Optionally, in the present solution, the aperture of the aperture stop of the lens group itself ranges from 3.8 mm to 4.2 mm, preferably 4 mm. On the one hand, the size of the aperture stop simulates the normal size of the human pupil; on the other hand, by controlling the size of the aperture stop, it is possible to auxiliary limit the angle of view of the detection lens, so as to simulate the working conditions of the actual use of the head-mounted display.

Optionally, the overall diameter of the first lens group and the second lens group is less than or equal to 40 mm, for example, it may be 35 mm or 38 mm. This design ensures that the diameter of the detection lens will not be too large, otherwise it will lead to the inability to bring the light incident end close to the position of the exit pupil of the head-mounted display in practical applications since the head-mounted display often has a specific shape, and the space for placing the detection lens is limited. Since the diameter of the detection lens is relatively small, it is relatively difficult to achieve a relatively large angle of view. In this case, the solution achieves a large angle of view with a small diameter by configuring the first lens group with a condenser lens and the double-Gauss lens group.

Figure 3:
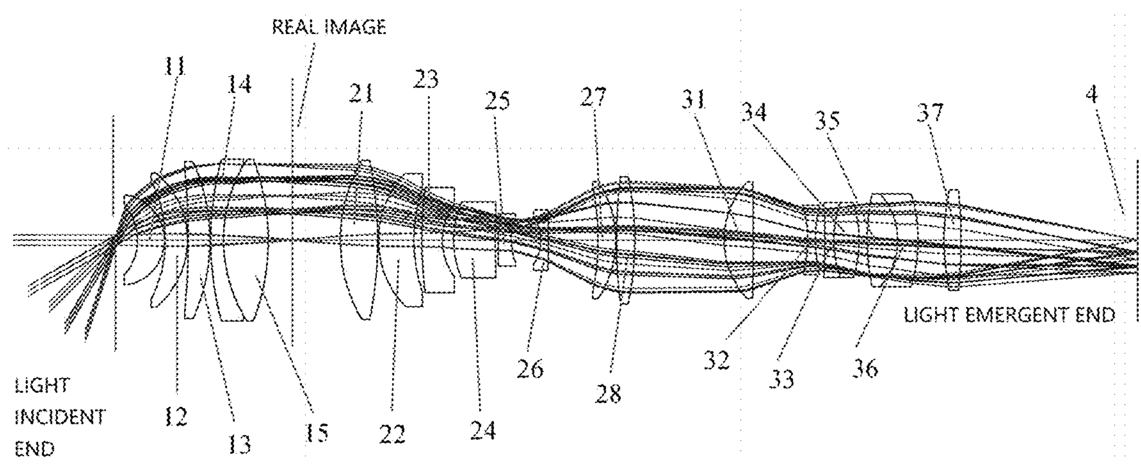
FIG. 3 is a schematic diagram of a lens group provided according to another embodiment of the present solution.

In another specific implementation of the present solution, FIG. 3 shows another implementation using the fisheye lens group, and the present solution is described below by using this implementation shown in FIG. 3.

In the second implementation, the first lens group may comprise three condenser lenses, which are a first condenser lens 11, a second condenser lens 12 and a third condenser lens 13 respectively. As shown in FIG. 1, the first condenser lens 11, the second condenser lens 12 and the third condenser lens 13 are arranged in sequence along a direction from the light incident end to the light emergent end. The first condenser lens 11 is located at a side of the second condenser lens close to the light incident end.

Optionally, in this implementation, the radius of curvature of the light incident surface of the first condenser lens 11 is −20.74 mm, the radius of curvature of the light emergent surface of the first condenser lens 11 is −17.87 mm, and the thickness of the first condenser lens 11 is 10.53 mm;

The radius of curvature of the light incident surface of the second condenser lens 12 is −51.62 mm, and the radius of curvature of the light emergent surface of the second condenser lens 12 is −34.26 mm. The thickness of the second condenser lens 12 is 8.65 mm, and a spacing between the second condenser lens 12 and the third condenser lens is 0.30 mm. The radius of curvature of the light incident surface of the third condenser lens 13 is −287.14, the radius of curvature of the light emergent surface of the third condenser lens 13 is −74.95 mm, and the thickness of the third condenser lens 13 is 8.51 mm.

In the above implementation of the condenser lens, the first, second and third condenser lenses may accurately gather light in the range with the lateral angle of view of about 120 degrees and longitudinal angle of view of about 80 degrees into the detection lens, and converge the irradiation direction of the light so that the light is irradiated onto the subsequent lenses as a whole. However, a barrel aberration may be generated in this process. In the optical processing of the subsequent lens, the barrel aberration will be further generated, and finally a distorted image will be generated. The advantage of this implementation is that the expected angle of view may be achieved by using fewer condenser lenses, or a larger angle of view may be obtained by using a larger number of condenser lenses. In the edge area of the generated image, in order to accommodate more light, a pixel point receives more light compared to the implementation where a flat field lens is used. This also causes a relative change in the aberration detection of the edge area of the image.

In addition to the first, second and third condenser lenses, the first lens group may also comprise a plurality of lenses, so that the light may generate an intermediate real image after passing through the first lens group.

In the present implementation, the first lens group comprises the above condenser lens and two first condenser lenses, and the two first condenser lenses are lens 14, and lens 15 in sequence in the following table along the direction from the light incident end to the light emergent end.

TABLE 4

| | radius of curvature of light incident surface mm | radius of curvature of light emergent surface mm | thickness of lens mm | distance from the lens on the side of the light emergent end mm |
|---|---|---|---|---|
| first condenser lens 11 | −20.746 | −17.875 | 10.531 | 0.300 |
| second condenser lens 12 | −51.627 | −34.264 | 8.650 | 0.300 |
| third condenser lens 13 | −287.149 | −74.951 | 8.514 | 0.300 |
| lens 14 | 123.183 | 59.702 | 5.000 | 0 |
| lens 15 | 59.702 | −89.138 | 17.459 | 10.372 |

Table 4 shows an implementation of another fisheye lens group "f-theta lens" in the present solution, as shown in FIG. 3. Wherein, on the side of the light emergent end of the lens 15, it is a real image presented by the first lens group in the detection lens, and the distance between the lens 15 and the real image along the optical axis is 10.372304 mm. On the side of the light incident end of the condenser lens, it is the real image (exit pupil) projected by the head-mounted display, and the distance between the real image and the condenser lens along the optical axis is 8.302543 mm. In particular, in the present solution, the light incident end and the real image projected by the head-mounted display are at the same position, that is, the distance between the light incident end and the condenser lens may also be 8.302543 mm. As shown in FIG. 3, the angle of view in this optional specific implementation tends to be 120 degrees*80 degrees.

As described above, the second lens group is used to compensate for the aberration generated in the overall imaging process, and finally generates an image on the image sensor 4 located at the light emergent end. The second lens group may comprise a double-Gauss lens group and a collimating lens group.

As shown in FIG. 3, the double-Gauss lens group may consist of eight lenses, wherein the first five lenses converge the light, and the last three lenses further adjust the lights to form scattered, relatively parallel lights. These eight lenses are arranged in sequence from the light incident end to the light emergent end as Gauss lens 21, Gauss lens 22, Gauss lens 23, Gauss lens 24, Gauss lens 25, Gauss lens 26, Gauss lens 27, and Gauss lens 28.

The parameters of various lenses in the double-Gauss lens group for this implementation are presented in the following Table 5:

TABLE 5

| | radius of curvature of light incident surface mm | radius of curvature of light emergent surface mm | thickness of lens mm | distance from the lens on the side of the light emergent end mm |
|---|---|---|---|---|
| Gauss lens 21 | 61.863 | −158.022 | 14.589 | 0.300 |
| Gauss lens 22 | 37.581 | 64.115 | 13.887 | 3.061 |
| Gauss lens 23 | 155.527 | 24.167 | 8.000 | 4.490 |
| Gauss lens 24 | 38.137 | 195.305 | 16.200 | 1.246 |
| Gauss lens 25 | −11182.667 | 23.465 | 5.000 | 11.527 |
| Gauss lens 26 | −17.073 | −278.147 | 3.000 | 19.373 |
| Gauss lens 27 | −104.482 | −41.930 | 6.934 | 0.300 |
| Gauss lens 28 | 202.162 | −120.092 | 7.153 | 34.865 |

Table 5 shows parameters of various lenses of the double-Gauss lens group of the fisheye lens group "f-theta lens" in the solution shown in FIG. 3, as shown in FIG. 3. Wherein, on the side of the light emergent end of the gauss lens 28, it is the other lenses of the second lens group in the detection lens, and the distance along the optical axis between gauss lens 28 and the next lens is 34.865381 mm. On the side of the light incident end of the gauss lens 21, it is the real image (exit pupil) formed by the first lens group in the detection lens, and the distance along the optical axis between the real image and gauss lens 21 is 17.789416 mmmm. In this solution, the double-Gauss lens group converges and then scatters the various colors of light of the image to compensate for the aberration of light of different wavelengths and reduce the interference of aberration on imaging detection.

As shown in FIG. 3, the collimating lens group may comprise seven lenses. In this implementation, the various collimating lenses are collimating lens 31, collimating lens 32, collimating lens 33, collimating lens 34, collimating lens 35, collimating lens 36 and collimating lens 37 respectively in sequence along the direction from the light incident end to the light emergent end. The collimating lens group is used to converge the scattered light processed by the double-Gauss lens group into a regionally parallel beam, and the lights of various colors of different wavelengths converge into a regionally parallel image again, so as to facilitate imaging on the image sensor 4 at the light emergent end.

The parameters of various lenses in the collimating lens group for this radius of radius of thickness distance from Table 6:

TABLE 6

| | radius of curvature of light incident surface mm | radius of curvature of light emergent surface mm | thickness of lens mm | distance from the lens on the side of the light emergent end mm |
|---|---|---|---|---|
| collimating lens 31 | 33.703 | −1483.014 | 11.352 | 21.297 |
| collimating lens 32 | −49.991 | 53.670 | 3.000 | 3.757 |
| collimating lens 33 | −207.948 | 43.715 | 3.500 | 0.000 |
| collimating lens 34 | 43.715 | −48.838 | 9.809 | 3.223 |
| collimating lens 35 | 89.475 | −27.828 | 11.845 | 0.000 |
| collimating lens 36 | −27.828 | −62.307 | 8.000 | 10.146 |
| collimating lens 37 | 95.173 | −197.752 | 6.627 | 68.942 |

Table 6 shows parameters of various lenses of the collimating lens group of the fisheye lens group "f-theta lens" in the solution shown in FIG. 3, as shown in FIG. 3. Wherein, on the side of the light emergent end of the collimating lens 37, it is the image sensor 4, and the distance between the collimating lens 37 and the image sensor 4 along the optical axis is 68.942486 mm. In particular, the light incident exit of the collimating lens 37 tends to be flat, which minimizes the aberration generated again after the light is emitted from the collimating lens 37, and the collimating lens 37 is used to calibrate the direction of the image light so that the light is irradiated on the image sensor 4 in a converged form. On the side of light incident end of the collimating lens 31, it is the last Gauss lens of the second lens group, that is, Gauss lens 25.

Optionally, in this solution, different glass materials may be used for different lenses to achieve better optical effects. Different glass materials have different refractive indices and astigmatism effects on light of different wavelengths. The glass material may be selected from existing standard glass materials. Taking the technical solution shown in FIG. 3 as an example, for the first lens group, the glass number of the first condenser lens 11 is 946179, the glass number of the second condenser lens 12 is 805255, the glass number of the third condenser lens 13 is 835427, the glass number of lens 14 is 805255, and the glass number of lens 15 is 438945.

For the double-Gauss lens group, the glass number of the gauss lens 21 is 438945, the glass number of the gauss lens 22 and the gauss lens 23 is 805255, the glass number of the gauss lens 24 is 717295, the glass number of the gauss lens 25 is 946179, the glass number of the gauss lens 26 is 518590, the glass number of the gauss lens 28 is 805255, and the glass number of the gauss lens 25 is 835427.

For the collimating lens group, the glass number of the collimating lens 31 is 438945, the glass number of the collimating lens 32 is 923209, the glass number of the collimating lens 33 is 805255, the glass number of the collimating lens 34 is 438945, the glass number of the collimating lens 35 is 593683, the glass number of the collimating lens 36 is 805255, and the glass number of the collimating lens 37 is 593683.

Figure 4A:
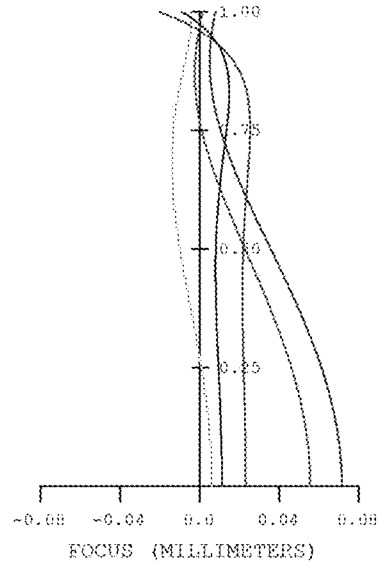
FIG. 4(*a*) to FIG. 4(*c*) are schematic diagrams of imaging parameters of a detection lens according to the embodiment shown in FIG. 3.
Figure 4B:
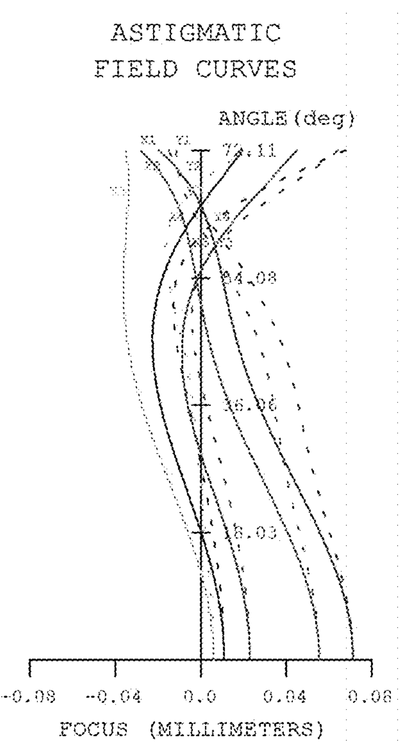
Figure 4C:
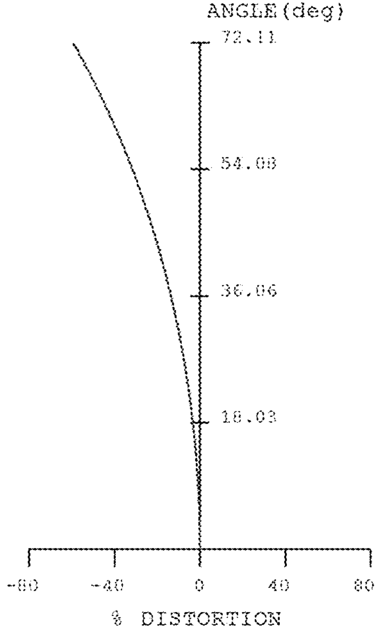

FIG. 4 shows the limiting effect of the embodiment shown in FIG. 3 on image aberration. FIG. 4(*a*) is a schematic diagram of longitudinal spherical aberration; FIG. 4(*b*) is a schematic diagram of field astigmatism; FIG. 4(*c*) is a schematic diagram of distortion. The aberration in the present implementation is large, and the first lens group and the second lens group form the fisheye lens group.

The present solution further provides a detection method for a head-mounted display, which comprises using the detection lens in the above solution, and aligning a light incident end of the detection lens with the head-mounted display to be tested. Preferably, the axis of the detection lens is overlapped with the display optical axis of the head-mounted display to be detected.

Along the axial direction of the detection lens, adjusting the light incident end of the detection lens to a position overlapping with an exit pupil (real image) projected by the detection lens display device to be detected.

Acquiring an image projected by the head-mounted display to be detected by using the above detection lens. The acquired images are subsequently analyzed.

The above disclosure is only a preferred embodiment of the present disclosure, and certainly does not limit the scope of the present disclosure. It will be understood by those of ordinary skill in the art that all or a part of the processes for implementing the above embodiments, as well as equivalent changes made in accordance with the claims of the present disclosure, are still within the scope of the present disclosure.

The invention claimed is:

1. A detection lens for a head-mounted display, wherein,
- the detection lens is provided with a light incident end, and is configured for receiving light from the light incident end;
- the detection lens comprises a lens group, and an overall entrance pupil of the lens group overlaps with an aperture stop of the lens group;
- the lens group comprises a first lens group and a second lens group, wherein
  - the first lens group is closer to the light incident end relative to the second lens group along an axial direction of the detection lens,
  - an effective focal length of the first lens group ranges from 20 mm to 40 mm,
  - a magnification of the second lens group ranges from 0.5 to 2, and
  - an effective focal length of the second lens group ranges from 195 mm to 285 mm;
- the second lens group comprises a double-Gauss lens group, wherein
  - the double-Gauss lens group is located close to the light incident end in the second lens group, and
  - a side of the double-Gauss lens group close to the light incident end is provided with at least three Gauss lenses which have positive focal powers; and
- the detection lens has a lateral angle of view of less than or equal to 120 degrees and a longitudinal angle of view of less than or equal to 80 degrees.

2. The detection lens according to claim 1, wherein the effective focal length of the first lens group ranges from 22 mm to 25 mm.

3. The detection lens according to claim 1, wherein the magnification of the second lens group ranges from 0.6 to 1.0.

4. The detection lens according to claim 1, wherein
- the first lens group comprises three condenser lenses, which are a first condenser lens, a second condenser lens and a third condenser lens respectively;
- the first condenser lens is closer to the light incident end with respect to the second condenser lens; and
- the second condenser lens is closer to the light incident end with respect to the third condenser lens.

5. The detection lens according to claim 4, wherein each of the condenser lenses are crescent-shaped lenses.

6. The detection lens according to claim 1, wherein
- the second lens group comprises a collimating lens group; and
- the double-Gauss lens group is close to the light incident end relative to the collimating lens group.

7. The detection lens according to claim 1, wherein the first lens group and the second lens group have a diameter of less than or equal to 65 mm.

8. The detection lens according to claim 1, wherein
- the double-Gauss lens group comprises three Gaussian lenses, which are a first Gaussian lens, a second Gaussian lens, and a third Gaussian lens respectively;
- a radius of curvature of a light incident surface of the first Gaussian lens ranges from 59.5 mm to 62.5 mm, a radius of curvature of a light emergent surface of the first Gaussian lens ranges from −165.5 mm to −156.7 mm, and a thickness of the first Gaussian lens ranges from 14.0 mm to 15.0 mm;
- a distance between the first Gaussian lens and the second Gaussian lens is 0.3 mm;
- a radius of curvature of a light incident surface of the second Gaussian lens ranges from 36.0 mm to 39.0 mm, a radius of curvature of a light emergent surface of the second Gaussian lens ranges from 60.0 mm to 66.0 mm, and a thickness of the second Gaussian lens ranges from 13.0 mm to 14.0 mm;
- a distance between the second Gaussian lens and the third Gaussian lens ranges from 3.0 mm to 3.2 mm; and
- a radius of curvature of a light incident surface of the third Gaussian lens ranges from 153.0 mm to 156.9 mm, a radius of curvature of a light emergent surface of the third Gaussian lens ranges from 23.5 mm to 25.3 mm, and a thickness of the third Gaussian lens ranges from 7.8 mm to 8.3 mm.

9. The detection lens according to claim 1, wherein the first lens group is configured to be able to move as a whole along an axial direction of the detection lens.

10. A detection method for a head-mounted display, comprising:
- using the detection lens according to claim 1;
- aligning a light incident end of the detection lens with a head-mounted display to be detected;
- adjusting, along an axial direction of the lens, the light incident end of the detection lens to a position overlapping with an exit pupil projected by the head-mounted display to be detected; and
- acquiring, with the detection lens, an image projected by the head-mounted display to be detected.

* * * * *